United States Patent [19]
Wicks et al.

[11] Patent Number: 5,914,669
[45] Date of Patent: Jun. 22, 1999

[54] PAGER WITH ROTATING DIAL FOR INPUTTING MESSAGES

[75] Inventors: James E. Wicks, San Francisco, Calif.; Eduardo Sciammarella, Hoboken, N.J.

[73] Assignees: Sony Corporation, Tokyo, Japan; Sony Electronics, Inc., Park Ridge, N.J.

[21] Appl. No.: 08/810,805

[22] Filed: Mar. 6, 1997

[51] Int. Cl.$^6$ ................................................ G08B 5/22
[52] U.S. Cl. ................... 340/825.44; 341/192; 341/35
[58] Field of Search ..................... 340/825.44, 825.47, 340/311.1, 825.48, 825.56; 455/31.3, 31.2, 38.1, 38.4, 412, 426, 458; 379/67.1, 355, 142, 354; 341/35, 192

[56] References Cited

U.S. PATENT DOCUMENTS

| | | | |
|---|---|---|---|
| Re. 32,365 | 3/1987 | Sebestyen | 340/311.1 |
| 3,976,995 | 8/1976 | Sebestyen | 340/337 |
| 4,021,608 | 5/1977 | Brodeur | 178/30 |
| 4,646,081 | 2/1987 | Tsunoda | 340/825.44 |
| 4,670,747 | 6/1987 | Borras et al. | 340/825.56 |
| 5,177,478 | 1/1993 | Wagai et al. | 340/825.44 |
| 5,315,635 | 5/1994 | Kane et al. | 379/57 |
| 5,710,545 | 1/1998 | Dunn | 340/825.44 |

*Primary Examiner*—Michael Horabik
*Assistant Examiner*—Jean B. Jeanglaude
*Attorney, Agent, or Firm*—Ronald P. Kananen; Rader, Fishman & Grauer

[57] ABSTRACT

A novel pager allows the input and transmission of a virtual unlimited range of messages. The pager has a character dial on the periphery of which are printed the letters of the alphabet and digits 0 to 9. A rotary encoder encodes the movement of the dial. When a selection key is pressed, the character showing through a window in the housing of the pager is selected and entered. When the message is completed, the pager may transmit the message to a paging system by radio transmission to a base station or by emitting a series of sounds in which the message is encoded. In the case of emitted sounds, the sounds are conveyed along an open phone line to the paging system where they are decoded.

15 Claims, 4 Drawing Sheets

PAGER WITH ROTATING DIAL FOR INPUTTING MESSAGES

FIELD OF THE INVENTION

The present invention relates generally to the field of wireless pagers. More particularly, the present invention relates to a wireless pager which incorporates a character or alpha-numeric dial as a means of inputting a message to be transmitted by the pager.

BACKGROUND OF THE INVENTION

Portable radio receivers and transceivers, such as wireless pagers, have become increasingly popular as a means of communication. Pagers are typically carried by users who wish or need to communicate when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit data back to the system. This is referred to as two-way paging.

Because the strength of a transmission from a pager 15 is tightly constrained by the battery power available to the pager, a two-way paging system must include a greater number of receiving base stations 14 than transmitting base stations 13. The receiving base stations 14 are smaller and distributed more widely than transmitting base stations 13 in order to receive the relatively weak transmissions broadcast by individual pagers 15. The receiving base stations 14 must be sufficient in number and distribution to receive pager transmissions originating anywhere in the service area.

With the advent of two-way paging, the pager user's ability to effectively communicate is limited only by the range of available messages the pager is capable of transmitting to the system. For example, to minimize equipment expense and power consumption, conventional two-way pagers may provide the pager user with a limited range of "multiple choice" responses to a page transmitted by the system. Alternatively, the pager may allow the pager user to initiate a transmission to the system from a limited list of pre-defined messages.

While more effective than merely receiving messages from the paging system, these methods obviously limit the pager user's ability to communicate. Accordingly, a need exists for a pager and paging system that provide the pager user with a much greater range of possible responses to a page or messages to be sent via the pager.

SUMMARY OF THE INVENTION

It is an object of the present invention to meet the above identified needs and others. Particularly, it is an object of the present invention to provide a pager which allows the pager user to input and transmit a virtually unlimited range of messages using an character dial.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a pager having: a controller; a character dial rotatably mounted to the pager with characters disposed thereon; a rotary encoder which encodes rotation of the dial and indicates the rotation to the controller; and an input means that signals the controller to identify a character from among those disposed on the dial. The character identified is determined by the controller based on the rotational position of the dial when the signal is received from the input means. The input means may be a selection key.

The pager of the present invention may further include an antenna for transmitting a message comprised of identified characters to a base station of a paging system. The pager may also include a speaker. With a speaker, the controller encodes a message comprised of identified characters as a series of sounds which are produced by the speaker.

The pager of the present invention may also have a display on which the identified character is displayed; and a memory unit in which is stored at least one identification number for a pager to which a message comprising the identified character is to be sent.

The present invention also encompasses a method of using a pager to transmit a message by: rotating a character dial rotatably mounted to the pager with characters disposed thereon; encoding rotation of the dial; indicating the encoded rotation to a controller; and identifying a character from among those disposed on the dial by signalling the controller. Again, the character identified is determined by the controller based on the rotational position of the dial when the signalling occurs. The signalling may be performed with a selection key.

The present method may continue by transmitting a message comprised of identified characters to a base station of a paging system. The present method may also continue by: encoding a message comprised of identified characters as a series of sound; emitting the series of sounds with a speaker provided on the pager; calling a paging system with a telephone; holding the speaker to a microphone of the telephone during the emitting of the series of sounds; emitting the series of sounds in response to a signal received by the controller; and decoding the series of sounds with the paging system to obtain the message.

The method of the present invention may continue by displaying the identified character on a display; and retrieving from a memory unit at least one identification number for a pager to which a message comprising the identified character is to be sent.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Figure 2:
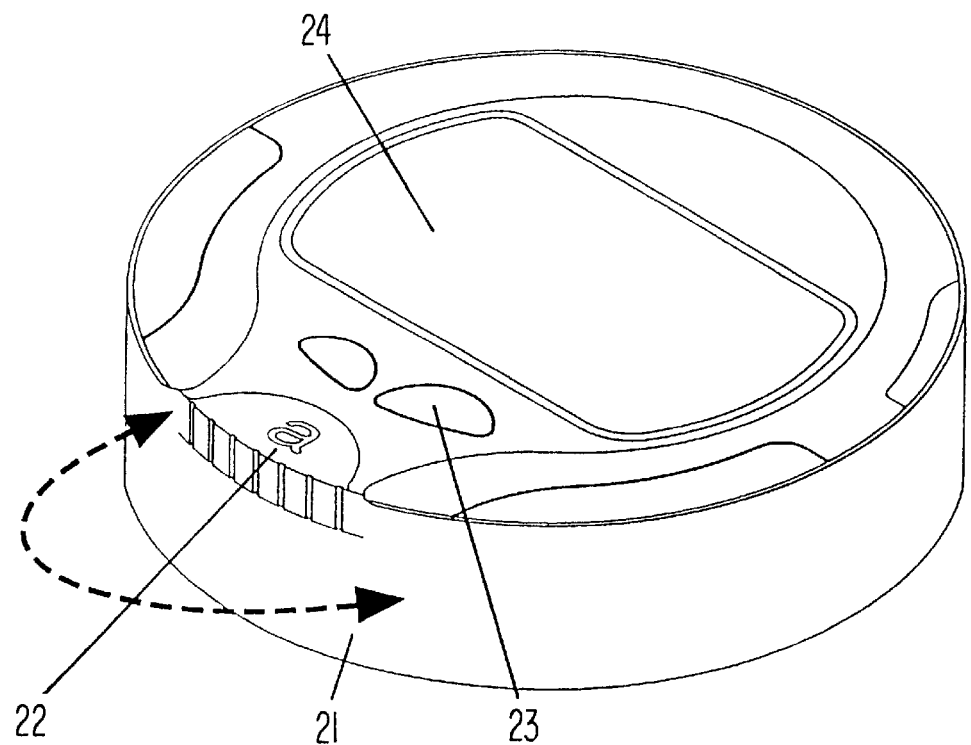
FIG. 2 illustrates a pager according to the present invention.

Using the drawings, the preferred embodiment of the present invention will now be explained. As shown in FIG. 2, the pager 21 according to the principles of the present invention includes a display 24, input keys, including a selection key, 23 and a character dial 22.

The letters of the alphabet and, preferably, digits 0 to 9 are arranged around the periphery of character dial 22. As the dial is rotated, individual letters or numbers will be exposed through a window as shown in FIG. 2. The window is preferably in the upper surface of the pager 21.

The dial 22 is rotated manually by the pager user. To facilitate such rotation, ridges or indentations may be axially provided around the periphery of the dial 22 to increase the friction between the dial 22 and a user's finger. It should also be noted that other mechanical or powered means of rotating dial 22 are within the scope of the invention, but are not viewed as cost-effective.

As will be described in more detail herein, the pager user can enter a message to be transmitted by rotating dial 22 until the first letter or number of the message appears or is centered in the window as shown in FIG. 2. The pager user then presses the selection key, on of input keys 23, to select that letter as part of the message to be sent.

Figure 4:
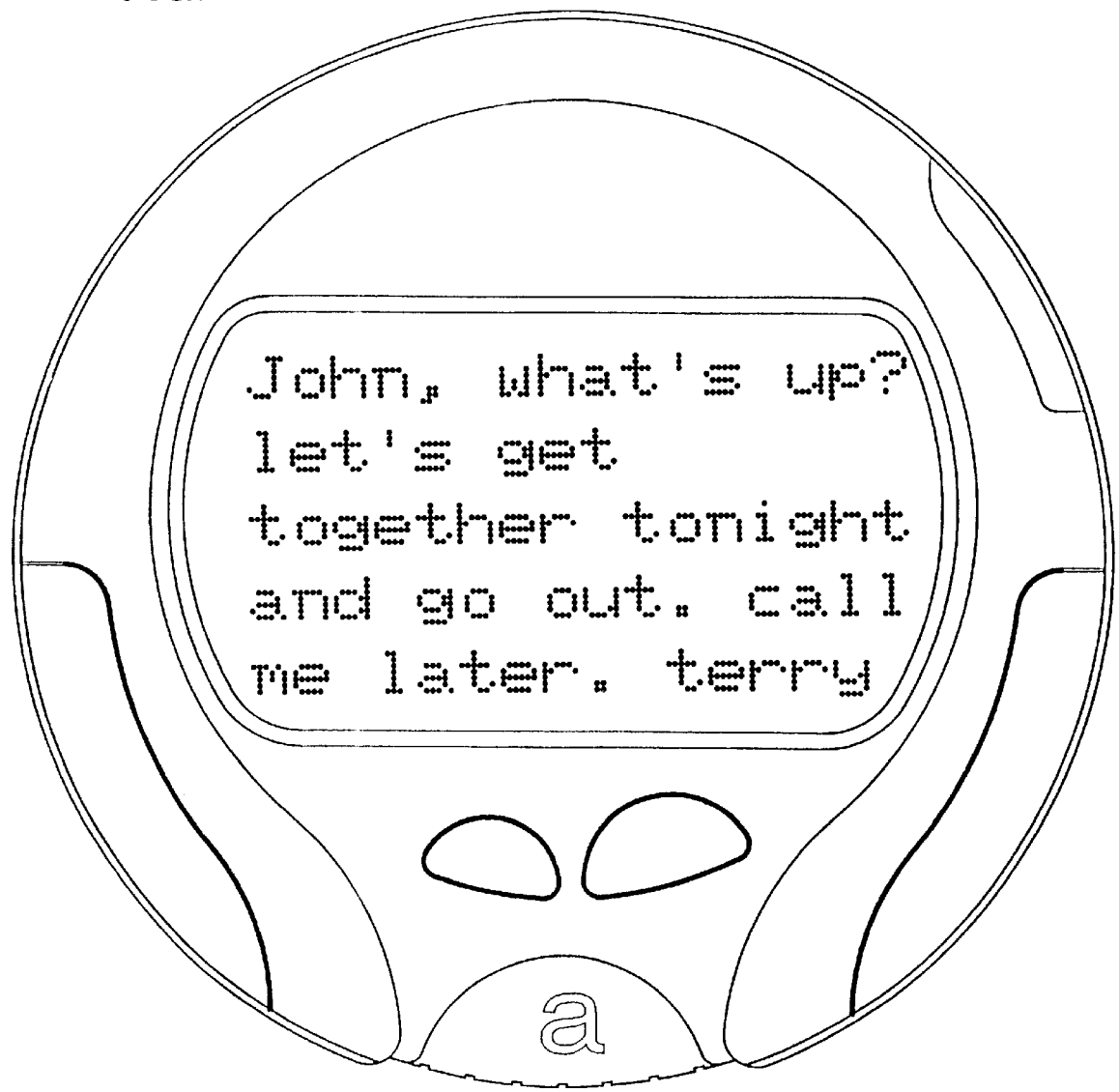
FIG. 4 illustrates a message created and displayed on a pager according to the present invention.

This process is repeated with the second letter or number of the message, the third, and so on until the message is complete. FIG. 4 illustrates a pager according to the present invention on which a message to be transmitted has been entered. As shown, the entered message is displayed on the display 24 so that the pager user may see exactly what is to be transmitted.

Once the message has been entered, there are two methods by which the pager user can transmit the message. The method used will depend on whether the pager 21 is a one- or two-way pager.

Figure 3:
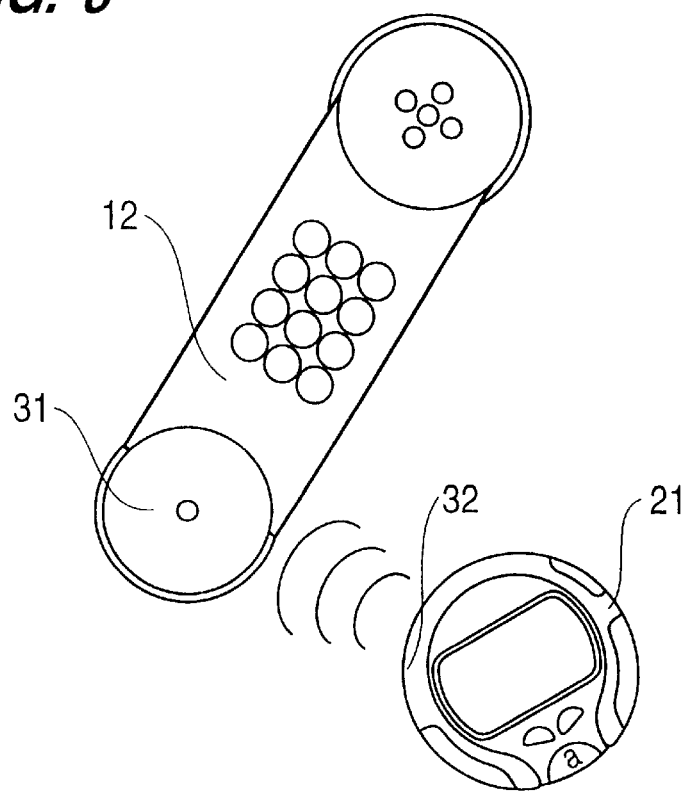
FIG. 3 illustrates one means of using a pager according to the present invention to transmit a message.

If pager 21 is a one-way pager, the message may be transmitted by the method shown in FIG. 3. In this method, the pager user requires a telephone 12. Using telephone 12, the pager user calls the local paging system service provider (11 in FIG. 1) and identifies the pager to which the message is to be sent.

Pager 21 is provided with a speaker 32 on its rear or side surface. Once the pager user has contacted the service provider using telephone 12, the pager user can then hold the speaker 32 of pager 21 in close proximity to the microphone 31 of telephone 12.

Pager 21 may also be provided with a transmit key, among the input keys 23. When the pager user presses the transmit key, pager 21 will emit a series of sounds through speaker 32 which will be transduced by microphone 31 and transmitted to the service provider. The service provider will then translate the series of sounds into the message as entered by the pager user.

As discussed earlier in reference to FIG. 1, when contacting the service provider 11 to send a message to a pager, the pager to which the message will be sent must be identified, typically by an identification number. In the present embodiment of the invention, the identification number of the pager which is to receive the message may be stated over the telephone by the pager user before the input message is transmitted in the manner described.

Alternatively, to further automate the process, the recipient pager identification number may be entered at the beginning or end of the input message. The identification number is then transmitted to the service provider as described, i.e, through a series of sounds emitted by speaker 32, transduced by microphone 31 and translated by the service provider 11. Service provider 11 can then direct the message to the identified recipient.

Various methods for coding and decoding a series of sounds to convey the input message through the phone 12 to the service provider 11 are within the purview of one skilled in the art and are not detailed herein. Any such method may be used under the principles of the present invention.

Figure 5:
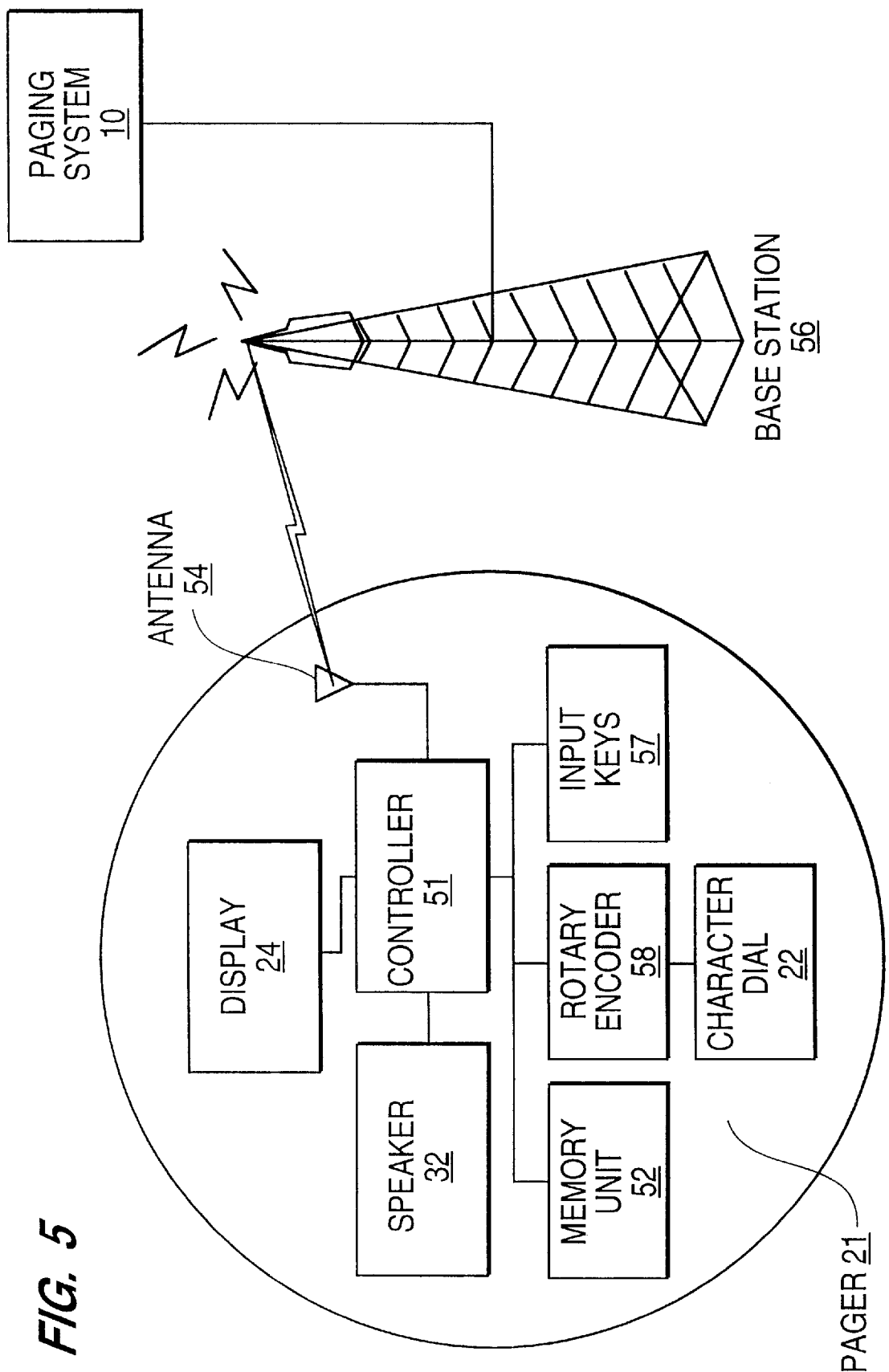
FIG. 5 is a block diagram of the key internal components of a pager according to the present invention.

Referring now to FIG. 5, the pager 21 must have a rotary encoder 58 which encodes the rotation of the dial 22. The encoder sends signals indicating the rotation of dial 22 to a controller 51. Having been calibrated previously, the controller 51 uses the signals from the rotary encoder 58 to determine which letter or number is centrally located in the window when the selection key, one of input keys 57, is pressed. That letter is then entered as a part of the message being input.

Figure 1:
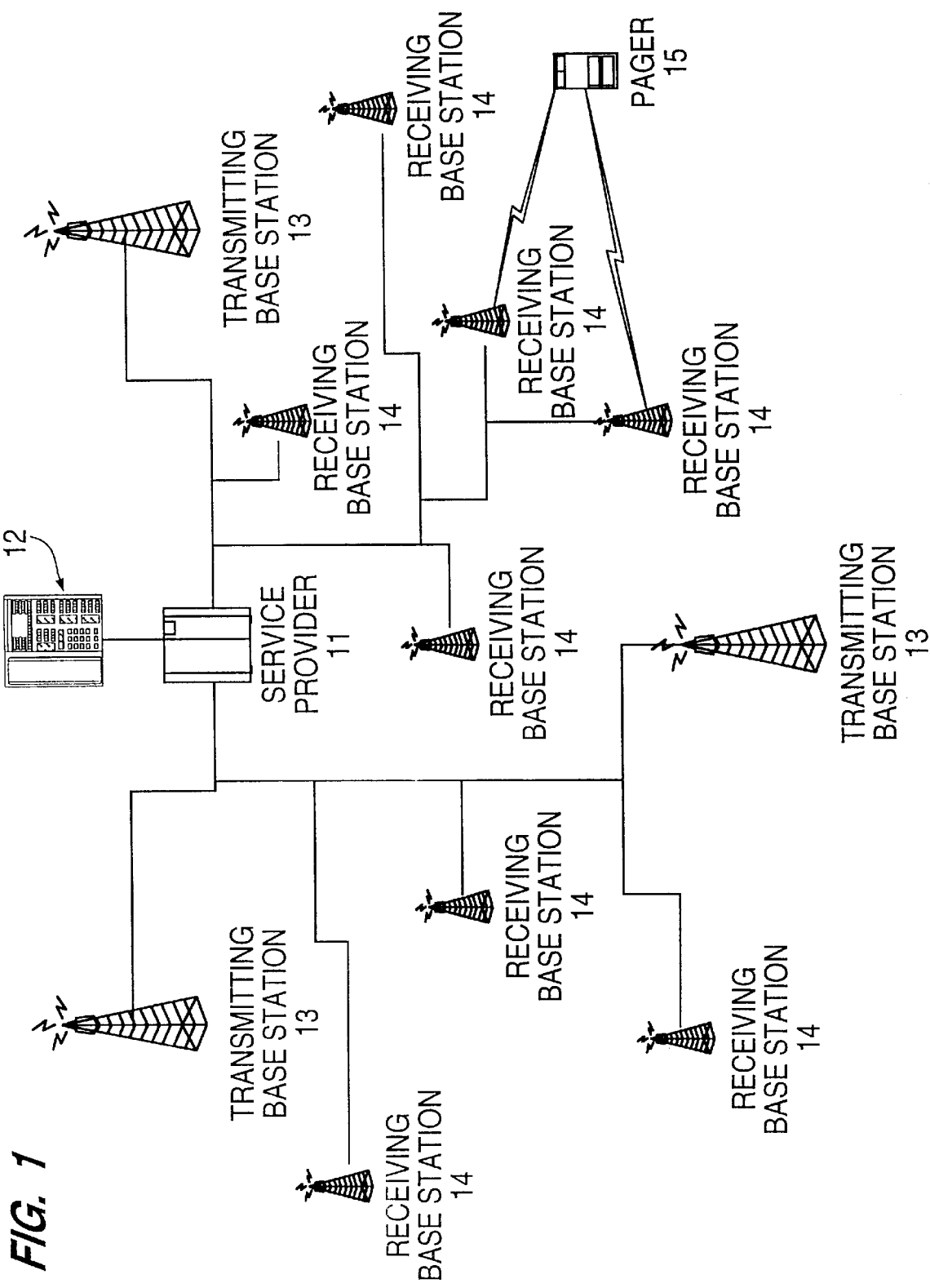
FIG. 1 is a schematic diagram of a two-way paging network with which a pager according to the present invention may be used.

If the pager 21 is a two-way pager, after a message has been entered as described above, including the identification number of the recipient pager, the transmit key, one of the input keys 57, is pressed. Controller 51 then transmits the message using antenna 54 to a nearby base station 56. The paging system 10 receives the message through base station 56 and transmits the message to the intended recipient's pager as shown in FIG. 1.

As shown in FIG. 5, the pager 21 of the present invention may embody both speaker 32 for transmitting messages in a one-way paging system and antenna 54 for transmitting messages in a two-way paging system. While these means for using both methods of sending messages may be included for the sake of versatility in a single pager under the present invention, only one is necessary to practice the invention.

In either a one- or two-way paging system, the pager 21 may include a memory unit 52. Memory unit 52 may be used to store identification numbers of pagers to which messages are frequently sent. With memory unit 52, the pager user can use input keys 57 to direct the controller to access and display the identification numbers stored in memory 52. The pager user may then select a number from those displayed as the identification number of the pager to which the message will be sent. Thus, the pager user need not continually re-enter the identification number each time a message is sent to that recipient.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A pager comprising:

an electronic controller;

a character dial rotatably mounted to said pager with characters disposed thereon;

a rotary encoder which encodes rotation of said dial and outputs an encoder signal indicating said rotation to said controller; and an input device which, when actuated by a user, signals said controller to identify a character from among those disposed on said dial, wherein the character identified is determined by said controller based on the rotational position of said dial at a time when said signal is received from said input device;

wherein said identified character is stored by said controller as part of a message.

2. A pager as claimed in claim 1, further comprising an antenna for transmitting a message comprised of identified characters to a base station of a paging system.

3. A pager as claimed in claim 1, further comprising a speaker, wherein said controller encodes a message comprised of identified characters as a series of sounds which are produced by said speaker.

4. A pager as claimed in claim 1, wherein said input device is a selection key.

5. A pager as claimed in claim 1, further comprising an electronic display on which said identified character is displayed.

6. A pager as claimed in claim 1, further comprising a memory unit in which is stored at least one identification number for a pager to which a message comprising said identified character is to be sent.

7. A method of using a pager to transmit a message comprising:

rotating a character dial rotatably mounted to said pager with characters disposed thereon;

encoding rotation of said dial with an encoder;

indicating said encoded rotation to a controller with an encoder signal from said encoder;

identifying a character from among those disposed on said dial by signaling said controller by actuating an input device, wherein the character identified is determined by said controller based on the rotational position of said dial as indicated by said encoder at a time when said signaling occurs; and storing said identified character as a part of a message being input.

8. A method as claimed in claim 7, further comprising transmitting a message comprised of identified characters to a base station of a paging system.

9. A method as claimed in claim 7, further comprising:

encoding a message comprised of identified characters as a series of sound; and emitting said series of sounds with a speaker provided on said pager.

10. A method as claimed in claim 7, wherein said signaling is performed by pressing a selection key which is part of said input device.

11. A method as claimed in claim 7, further comprising displaying said identified character on a display.

12. A method as claimed in claim 7, further comprising retrieving from a memory unit at least one identification number for a pager to which a message comprising said identified character is to be sent.

13. A method as claimed in claim 9, further comprising:

calling a paging system with a telephone;

holding said speaker to a microphone of said telephone during said emitting of a series of sounds.

14. A method as claimed in claim 9, further comprising emitting said series of sounds in response to a signal received by said controller.

15. A method as claimed in claim 13, further comprising decoding said series of sounds to obtain said message.

* * * * *